W. E. FOWLER, Jr.
ADJUSTABLE BRAKE HEAD.
APPLICATION FILED JUNE 19, 1908.
937,930.
Patented Oct. 26, 1909.
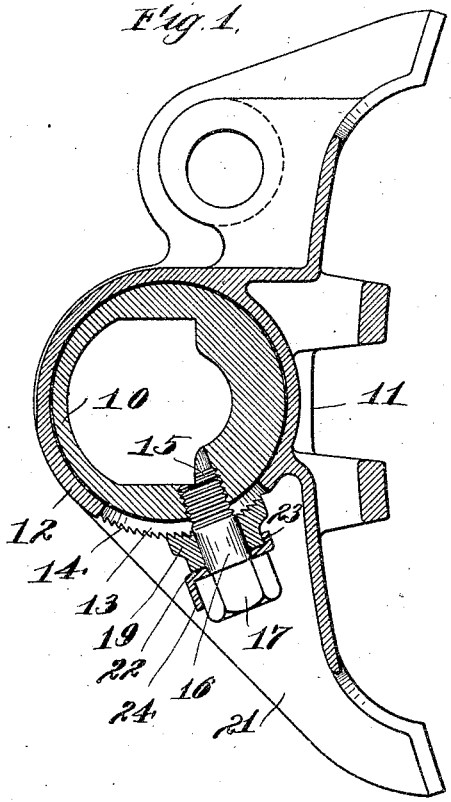
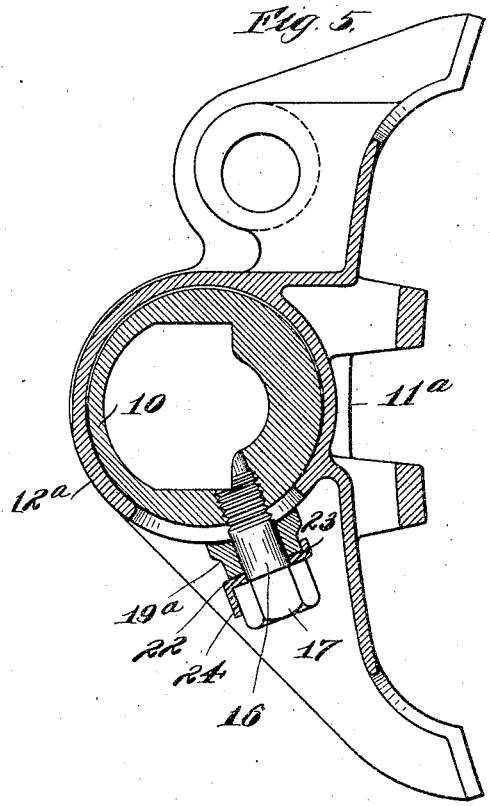
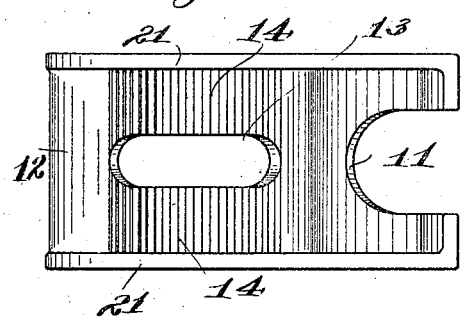
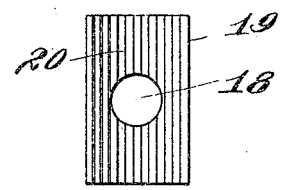
Witness
A. C. Riechers
Walter M. Fuller
Inventor
William E. Fowler Jr
By Offield Towle &
Linthicum
Attys

UNITED STATES PATENT OFFICE.

WILLIAM E. FOWLER, JR., OF HAMMOND, INDIANA, ASSIGNOR TO SIMPLEX RAILWAY APPLIANCE COMPANY, OF CHICAGO, ILLINOIS, A CORPORATION OF ILLINOIS.

ADJUSTABLE BRAKE-HEAD.

937,930.

Specification of Letters Patent.    Patented Oct. 26, 1909.

Application filed June 19, 1908.  Serial No. 439,448.

*To all whom it may concern:*

Be it known that I, WILLIAM E. FOWLER, Jr., a citizen of the United States, residing at Hammond, in the county of Lake and State of Indiana, have invented certain new and useful Improvements in Adjustable Brake-Heads, of which the following is a specification.

The main and leading object of this invention is to provide a simple and efficient means for securing a brake-head on the end of a brake beam in such manner that the head cannot move longitudinally of the beam but may be adjusted angularly thereon to obtain the proper relation of the brake-shoe carried by the head to the wheel periphery on which it acts. On the sleeve receiving and accommodating the ends of the compression bar and tension rod of a brake beam, and on which the brake head is adapted to be mounted, I secure a bolt, screw, or the like having a screw-threaded connection therewith, and on this bolt or stud I place a retainer or locking member which is adapted to bear against the exterior substantially cylindrical surface of the hub of the brake-head and may or may not have a serrated or roughened inner face in contact therewith. The stud or screw is intended to extend through a curved slot in the hub of the brake-head, thereby preventing longitudinal displacement of the head but permitting it to have an angular adjustment which when secured or obtained is maintained by the bearing of the retainer or locking member on the head.

On the accompanying sheet of drawings I have shown a desirable embodiment of this invention, and in the various views like parts are supplied with the same reference characters.

Figure 1 is a section through the brake-head, the sleeve on the end of the brake-head, and other parts illustrating in detail the members employed in carrying out my invention; Fig. 2 is a bottom plan view of the brake-head shown in Fig. 1; Fig. 3 is a face view showing the serrated concave surface of the retainer or locking member; Fig. 4 is an end view of the same; and Fig. 5 is a view similar to Fig. 1 of a modified construction in which no coöperating roughened or serrated surfaces are employed.

On a cylindrical sleeve 10 mounted, as is customary, on the end of the compression bar and tension rod of a brake-beam (not shown), I provide a brake-head 11 adapted to turn on the sleeve 10 to secure the proper angular adjustment of the head so that the shoe which it carries will be in proper relation to the periphery or tread of the car wheel. As is clearly indicated, the hub 12 of the brake-head 11 is supplied in its bottom portion with a curved slot 13 extended therethrough, the exterior surface 14 of the hub 12 on opposite sides of the slot being transversely serrated, scored, or roughened. The sleeve 10 has in register with the slot 13 a threaded aperture 15 which receives the inner screw-threaded end of a bolt, screw, stud, or the like 16, in the present instance a machine screw or bolt with an angular head 17 being illustrated. This screw or bolt passes through a central opening 18 in a retainer or locking member 19 having a concave serrated or roughened face 20 adapted to bear against the convex roughened surface 14 of the hub of the brake-head. It will be noticed that this retainer or locking member is of general rectangular shape and is readily accommodated between the parallel flanges 21 of the brake-head. In order to prevent turning of the screw or bolt 16 and its resultant disengagement with the sleeve 10, I provide a lock 22 which has one end 23 bent over in contact with a face of the retainer 19, its opposite end 24 being bent over so as to bear against one of the flat surfaces of the head 17. Owing to the fact that the surface 20 of the retainer 19 is of concave shape, it can not be turned on the stud or screw 16 when bearing against the convex face 14 of the brake-head hub, so that this retainer may be employed as a sort of anchor to prevent turning of the screw or bolt 16 by means of a lock 22 of the usual and general construction. The parts of this construction are assembled by sliding the brake-head on to the sleeve 10 longitudinally or axially, the sleeve being received by the cylindrical hollow recess of the hub 12, as is apparent. The bolt or screw 16 with the lock 22 and retainer 19 thereon is then passed through the slot 13 and screwed into the threaded aperture 15, this screw or stud preventing lengthwise shifting of the brake-head and hub on the internal sleeve. The head may then be turned to the proper angular position on its supporting sleeve, after which the screw or bolt 16 may be turned home so as to cause the firm engagement of the roughened surfaces 14 and 20 of the hub and retainer, respectively. Then the end 24 of the lock 22 may be bent up so as to bear against one of the flat surfaces of the head 17 and prevent backward turning and loosening of the screw or bolt 16.

The construction shown in Fig. 5 is substantially like that indicated in Figs. 1 to 4, inclusive, except that those convex portions of the hub 12ª forming a part of brake head 11ª against which the concave face of the retainer 19ª is adapted to bear are not roughened or scored, the concave face of the retainer being also smooth. In some cases the friction between these coöperating or concave and convex comparatively smooth surfaces is sufficient to effectually prevent turning of the brake head on the sleeve. This construction is susceptible of considerable variation in the structural features of its embodiments, and it is therefore to be understood that the invention is not limited to the precise features of construction shown and described.

I claim:

1. In a device of the character described, the combination of a brake-beam, a brake-head having a rough external surface fitted on and angularly adjustable on said brake-beam, and means mounted on said brake-beam and engaging said rough external surface of said brake-head to maintain the latter in adjusted angular position, substantially as described.

2. In a device of the character described, the combination of a brake-beam, a brake-head fitted on and angularly-adjustable on said brake-beam, said brake-head having a convex external surface, and means with a concave face bearing against said convex surface, mounted on said brake-beam, and adapted to hold said brake-head in adjusted angular position, substantially as described.

3. In a device of the character described, the combination of a brake-beam, a slotted brake-head fitted on and angularly-adjustable on said brake-beam, said brake-head having a convex external surface, and means extended through said slot, mounted on said brake-beam, and having a concave face bearing against said convex surface and adapted to hold said brake-head in adjusted angular position, substantially as described.

4. In a device of the character described, the combination of a brake-beam, a slotted brake-head fitted on and angularly-adjustable on said brake-beam, said brake-head having a convex roughened external surface, and means extended through said slot, mounted on said brake-beam, and having a concave roughened surface bearing against said convex roughened surface and adapted to hold said brake-head in adjusted angular position, substantially as described.

5. In a device of the character described, the combination of a cylindrical sleeve adapted to fit over the ends of the tension and compression members of a brake-beam, a brake-head fitted on and angularly-adjustable on said sleeve, and means mounted on said sleeve and adapted to bear against the external surface of said brake-head to hold the latter in adjusted angular position, substantially as described.

6. In a device of the character described, the combination of a sleeve adapted to fit over the ends of the tension and compression members of a brake-beam, a slotted brake-head fitted on and angularly-adjustable on said sleeve, and means mounted on said sleeve, extended through said slot, and adapted to bear against the external surface of said brake-head and hold said brake-head in adjusted angular position, substantially as described.

7. In a device of the character described, the combination of a sleeve adapted to fit over the ends of the tension and compression members of a brake-beam, a slotted brake-head fitted on and angularly-adjustable on said sleeve, said brake-head having a roughened external surface, and means mounted on said sleeve, extended through said slot, and provided with a roughened surface adapted to bear against the roughened surface of said brake-head to hold said brake-head in adjusted angular position, substantially as described.

8. In a device of the character described, the combination of a sleeve adapted to fit over the ends of the tension and compression members of a brake-beam, and having a screw-threaded aperture, a slotted brake-head fitted on and angularly-adjustable on said sleeve, said brake-head having a convex external surface, a screw extended through the slot of said brake-head and engaging the threads of the aperture of said sleeve, said screw having a head flat on its side, a retainer on said screw having a concave face adapted to bear against the convex surface of said brake-head to hold said brake-head in adjusted angular position, and a lock coacting with said retainer and the flat side of the head of the screw to prevent turning or loosening of the screw, substantially as described.

9. A brake-beam, a brake-head having a hub by means of which said head is rotatably mounted on the beam, and means carried by the beam to engage the outer side of said hub for locking said brake-head in adjusted position.

10. A brake beam, a brake-head having a hub by means of which said head is rotatably mounted on the beam, a locking block engaging the outer side of said hub for locking said brake head in adjusted position, and means for operating the block.

11. A brake beam, a brake-head having a hub by means of which said head is rotatably mounted on the beam, said hub being slotted, a locking block having a portion extending through said slot and engaging the beam, and means for holding said block in engagement with the outer side of said head.

12. A brake head having a hub, said hub being provided with a slot extending part way around the hub, the peripheral surface of said hub adjacent to said slot being toothed, substantially as described.

WILLIAM E. FOWLER, Jr.

Witnesses:
FREDERICK C. GOODWIN,
WALTER M. FULLER.